Oct. 5, 1965    L. G. SMITH    3,210,540
MODULATING STRUCTURE FOR MASS SPECTROMETERS
Filed Dec. 14, 1961    5 Sheets-Sheet 1
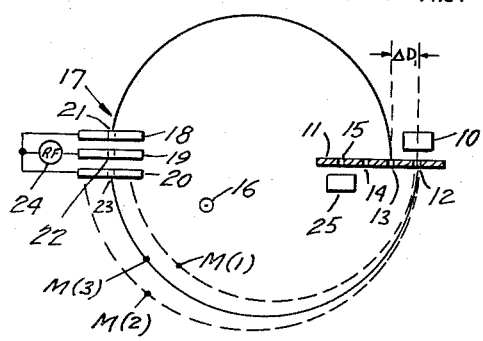
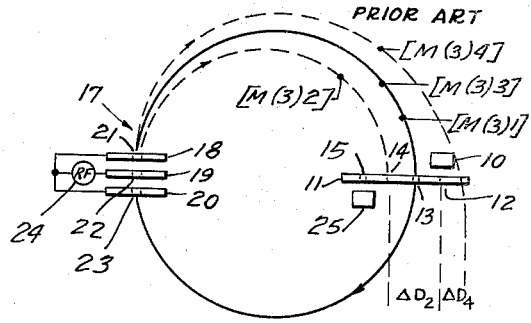
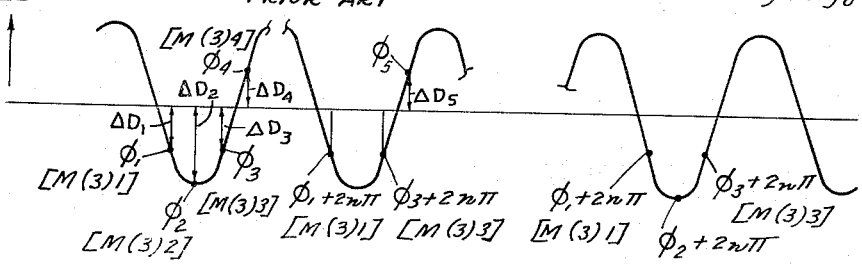
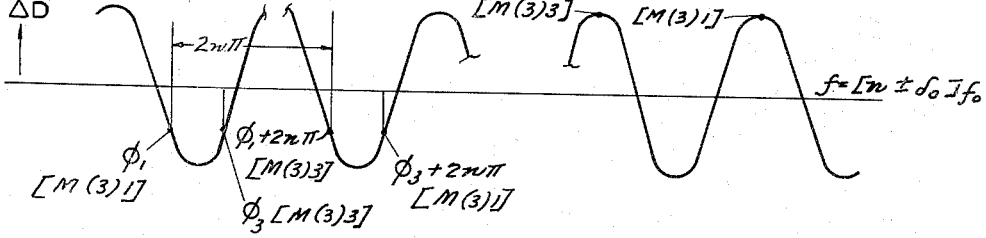
INVENTOR.
LINCOLN G. SMITH
BY
OSTROLENK, FABER, GERB & SOFFEN
ATTORNEYS Oct. 5, 1965 L. G. SMITH 3,210,540
MODULATING STRUCTURE FOR MASS SPECTROMETERS
Filed Dec. 14, 1961 5 Sheets-Sheet 2
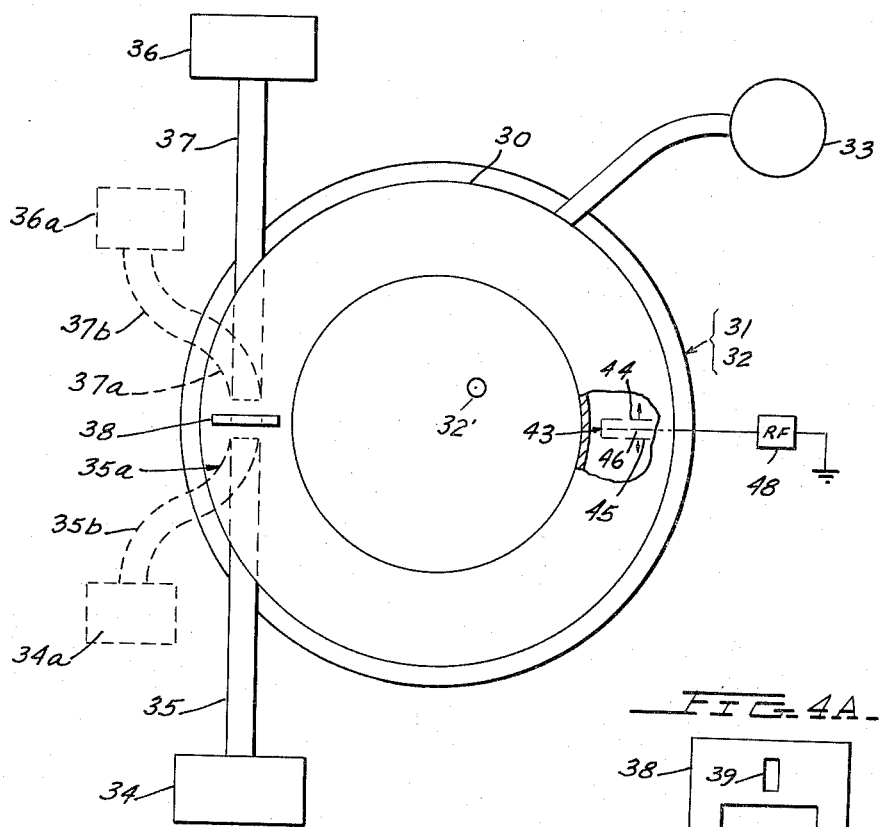
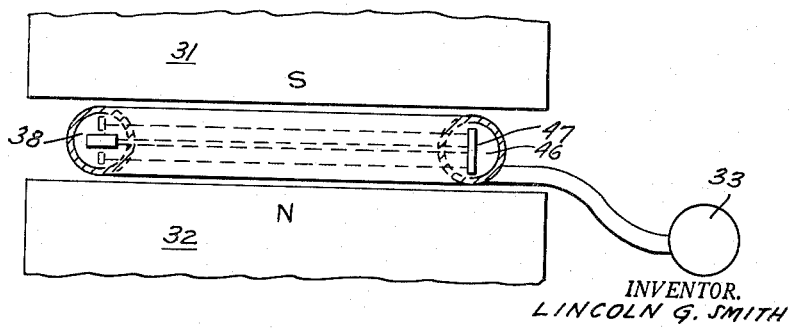
INVENTOR.
LINCOLN G. SMITH
BY
OSTROLENK, FABER, GERB & SOFFEN
ATTORNEYS Oct. 5, 1965 L. G. SMITH 3,210,540
MODULATING STRUCTURE FOR MASS SPECTROMETERS
Filed Dec. 14, 1961 5 Sheets-Sheet 3
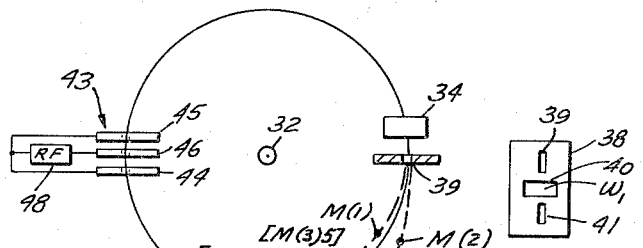
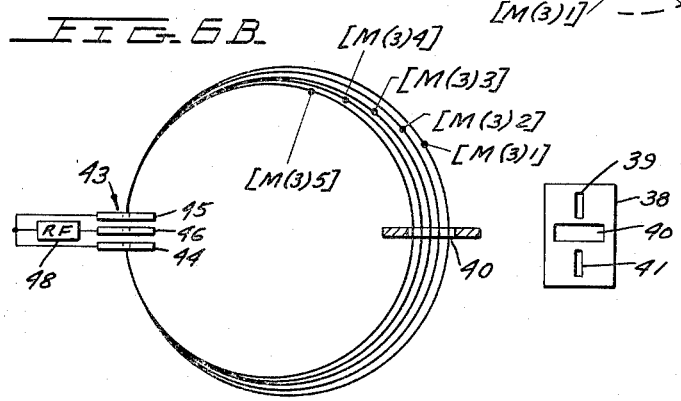
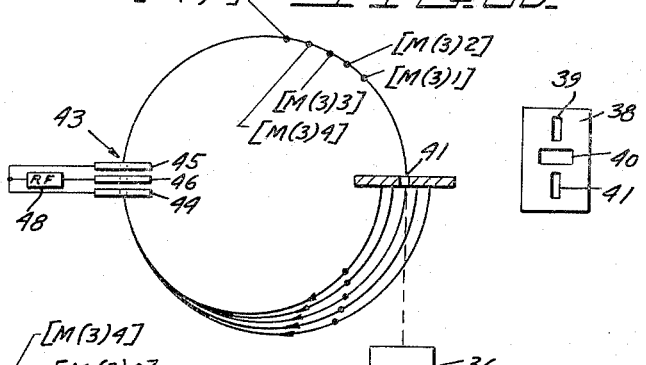
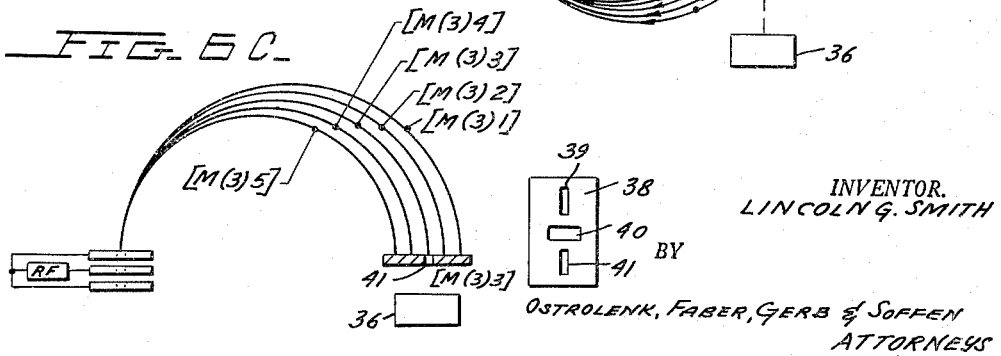
INVENTOR.
LINCOLN G. SMITH
BY
OSTROLENK, FABER, GERB & SOFFEN
ATTORNEYS

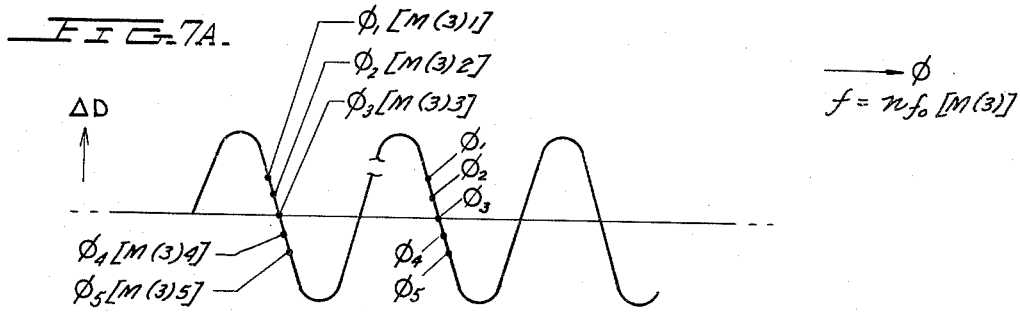
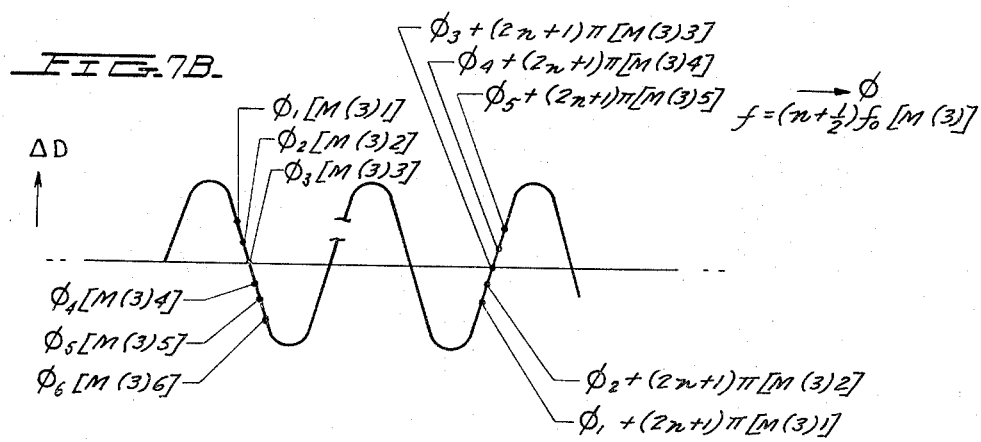
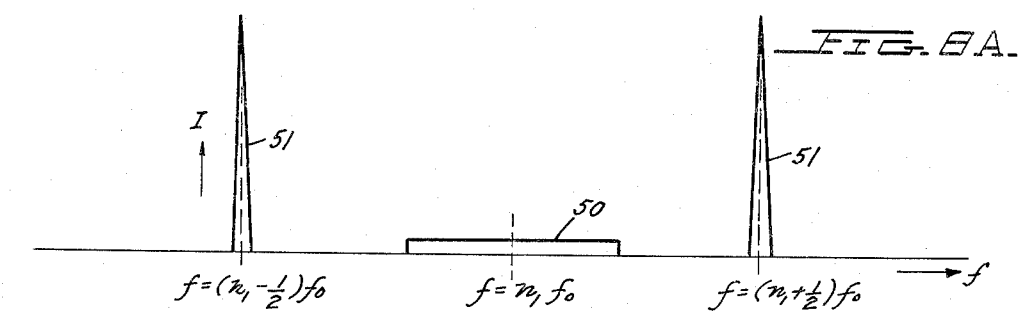
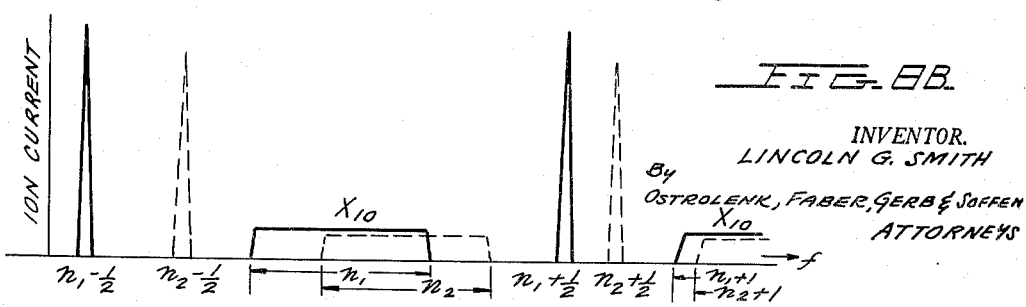

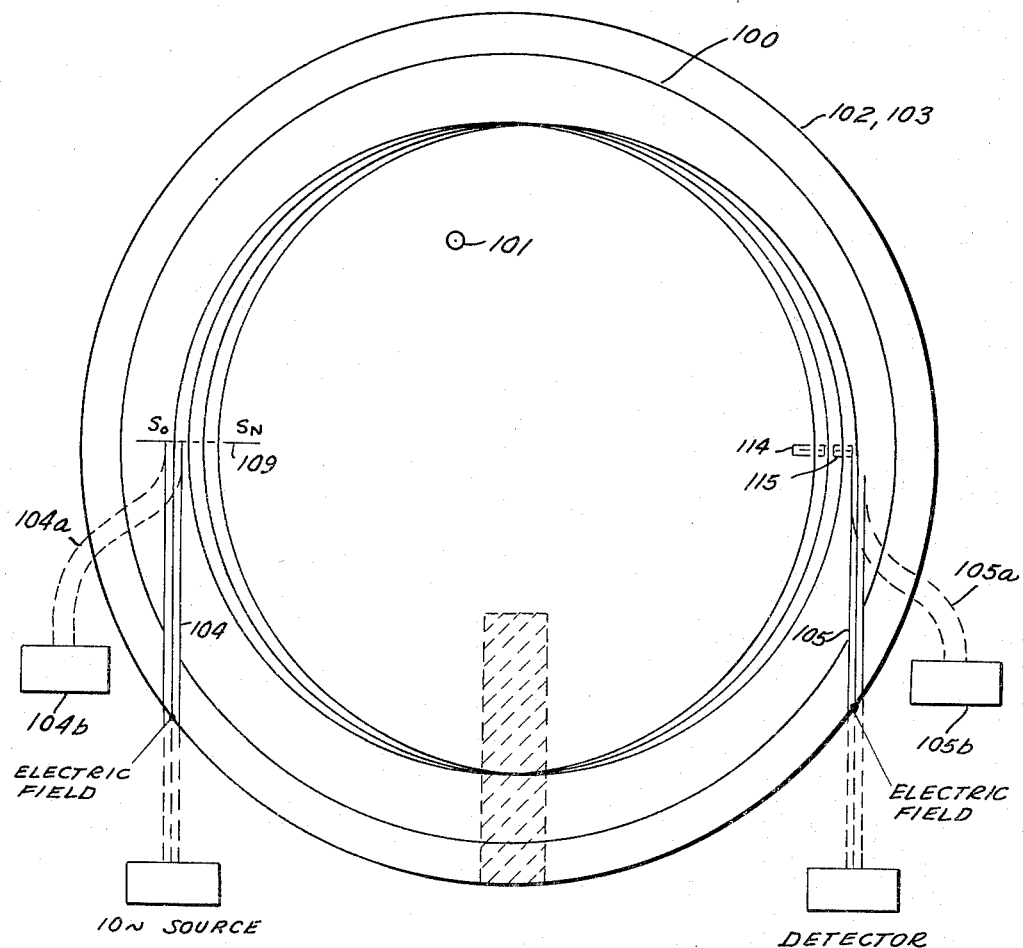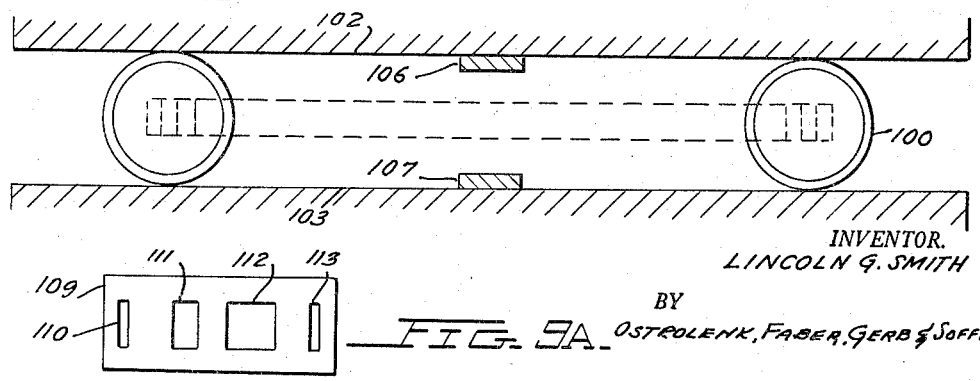

United States Patent Office 3,210,540
Patented Oct. 5, 1965

3,210,540
MODULATING STRUCTURE FOR MASS SPECTROMETERS
Lincoln G. Smith, 75 Crest View Drive, Princeton, N.J.
Filed Dec. 14, 1961, Ser. No. 159,217
5 Claims. (Cl. 250—41.9)

This invention relates to a mass spectrometer wherein ions travel in vacuo approximately normally to a uniform or slightly perturbed magnetic field in one or more complete, nearly circular orbits between an entrance and an exit slit, and in which they are separated according to their ratios of charge to mass by adjusting to high multiples of their circulation or "cyclotron" frequencies the frequency of two short high frequency fields in two "velocity modulators" (of different parts of one modulator) through which they pass. The modulators are placed diametrically opposite the entrance and exit slits so that a steady beam of monoenergetic ions of given charge-to-mass ratio accelerated from an ion source through the entrance slit in focused after one-half turn on the first modulator and so that a highly resolved series of ion groups is focused on the exit slit one half turn after leaving the second modulator.

This invention makes use of the well known perfect focusing of ions in time and in the radial direction normal to the magnetic field for all speeds and angles at integral numbers of turns from a first modulator and their first-order focusing in angle at one-half turn from each modulator and the entrance slit.

Mass spectrometers are known to the art wherein a high frequency modulator means modulates the velocity of ions in a beam and thus the diameter of the orbits of the ions. A mass spectrometer of this type employing pulse modulation of an ion beam has been described, for example, in my U.S. Patent No. 2,709,750, entitled "Magnetic-Period Mass Spectrometer" which issued May 31, 1955. An improvement of that device employing R.F. modulation is shown in my later publication entitled "Mass Synchrometer" of which I was co-author with C. C. Damm in the Review of Scientific Instruments, vol. 27, No. 8,638 through 649, August 1956.

In the device described in the latter publication, a steady beam of monoenergetic ions travels from an entrance slit in a substantially circular orbit under the influence of a uniform magnetic field in the usual manner. The ions are focused on a modulator which is 180° away from the ion source, so that only those with charge-to-mass ratios within a small range will pass through slits in the modulator.

The modulator, for example, can be comprised of three parallel plates having slits in registry with one another. With such a modulator, R.F. voltage is applied between the central plate and the two outer grounded plates so that when the ion beam passes through the aligned slits in the three plates, the electric fields between the plates will add or subtract energy to or from the ions of the beam. It has been shown in the above-noted article that the change in velocity of the ions of the beam is an harmonic function of R.F. phase when an ion passes the central plate whose amplitude is proportional to the voltage on the central plate.

Adjacent to the ion source of this prior device there are a plurality of slits including an entrance and an exit slit, in a radial plate extending inwardly of the orbit of the ions. As the beam of ions first passes through the modulator, the diameters of their orbits are changed by amounts that depend upon the instantaneous phase of R.F. voltage when each passes the central plate. Therefore, the beam of ions, after it passes the modulator will be spread out. Only those ions which have passed the central plate at two predetermined phases of the R.F. will receive such a decrease in orbital diameter that they may pass through the "phase-defining slit" next to the entrance slit.

The two groups of ions per cycle which pass this slit are again focused upon the modulator and pass through it a second time. If each passed the central plate the second time at the same phase as the first, it will receive nearly the same velocity change and its diameter will again be decreased by nearly the same amount as on the first pass. Both groups will then be focused upon a "satellite-suppressing slit" which is spaced inwardly from the phase-defining slit by about the same distance that the phase-defining slit is spaced from the entrance slit. This satellite-suppressing slit is generally considerably wider than other slits.

It will now be observed that it is only when the frequency of the R.F. voltage applied to the modulator is some integral number times the cyclotron frequency of the ions in these groups that both groups will receive the same diameter reduction on the second pass. This cyclotron frequency is inversely proportional to the mass of the ions and independent of their velocity. By sweeping the frequency of the R.F. source at a relatively very slow rate compared to the R.F., and by measuring the beam intensity of the ions which pass an exit slit at the position the satellite-suppressing, i.e., after two complete revolutions, one can make a plot (e.g. on an oscilloscope) of ion beam intensity as a function of frequency. This plot will show peaks at frequency values each of which is an integral number times the cyclotron frequency of the ions forming the beam current. Thus, one may in principle measure the masses of the ions in the beam.

It will be shown later that "satellites" appear symmetrically about each main peak so observed after but two revolutions. To eliminate these and further to increase resolution, a third pass is made through the modulator so that a third decrease in diameter again of about the same amount is applied to those ions which pass through the satellite-suppressing slit and which therefore meet the modulator the third time at about the initial phase. The ion beam current is then detected beyond the exit slit located radially inside the satellite-suppressing slit at a distance about equal to the spacing of the entrance and phase-defining slits.

It has been demonstrated in the paper noted above that the resolution of the prior device depends primarily on the widths of the entrance slit, the phase-defining slit, and the exit slit. More specifically, this paper shows that, for optimum intensity for given resolution, the phase-defining slit must be ⅔ as wide and the exit slit twice as wide as the entrance slit. Under these conditions, resolution is inversely proportional to the width of each of these slits. Thus, in order to achieve high resolution with this device, it is necessary that all three slits be very narrow compared to the amplitude of diameter modulation and thus to their separation. Hence, the portion of the ions passing the modulator on the first turn which is detected is very small (between 0.5 and 1% in the device described).

Moreover, in the prior device, the orbit diameter must be changed on each turn by the finite amount necessary to make ions miss the source housing after one turn by the high frequency field in the modulator. The fractional change of orbit diameter per turn in the device described is about 10%, so that an R.M.S. R.F. voltage of about 10% of the ions' initial energy in electron volts must be applied to the modulator therein.

With the device of the present invention, very high resolution may be achieved, that depends almost entirely on the widths of an entrance and an exit slit only and very little on the width of an intermediate phase-defining slit which may therefore be very much wider than the other slits, or even entirely absent. Thus a large fraction of the ions passing a modulator on the first turn is accepted and contributes to the height of the sharp resonance peak at each order. If no phase-defining slit is used, this fraction is 100% at each resonance peak. However, in this case, some much smaller fraction of ions is accepted at every intermediate frequency and peaks have wide skirts that underlie peaks of other types of ions, thus tending to falsify both their positions and magnitudes, particularly if they are nearby. To eliminate these skirts and thus provide adequate clear frequency range between orders of one type of ion for peaks of other types, use of a wide phase-defining slit is highly desirable. Though this reduces the fraction of ions accepted at the peaks below 100%, it is quite possible to have this fraction as large as 50% and still avoid entirely difficulties due to overlapping of peaks for different ions and at the same time to have peaks very nearly as sharp as though the phase-defining slit had infinitesimal width. Thus, an entirely practicable fraction of the D.-C. beam passing the modulator on the first turn that can be made to contribute to the height of each resonance peak with the device of the present invention is from 50 to 100 times as great as this fraction is with the prior device. This fact largely accounts for the fact that the intensity achievable with the new device for given resolution is of the order of 100 times that provided by either the prior device or any conventional double-focusing mass spectrometer with the same ion current per unit area at the source slit, the same lengths of slits and ion path and the same radius of curvature of ions in the magnetic field. Conversely, it means that the limit set solely by minimum usable intensity to the maximum attainable resolution is of the order of 100 times as great with the present device as with such other devices.

Attainment of such higher resolution for given intensity or vice versa as well as of much higher precision of mass measurement with the device of the present invention is made possible principally by the incorporation therein of two basic features. The first of these is auxiliary means of orbit displacement to make the ion beam miss the source housing and/or the entrance slit after one turn, which relieves the modulator field entirely of the obligation it has in the prior device to perform this essential function. Thus, with no R.F. voltage applied to the modulators, a D.-C. beam of ions of desired mass number proceeds from the entrance slit through the two modulators (or two parts of a single modulator) and the exit slit to the detector. Under these conditions, therefore, the novel device, like the prior one, functions as a simple 180° mass spectrometer providing relatively low resolution, but, unlike the prior one, does not require a second detector for this purpose. It is obvious that, with the incorporation of this feature, the only ions that can reach the detector in this novel device, when and so passes through the exit slit to the detector. Moreover, at a frequency of slightly above or below $(n+\frac{1}{2})f_0$, only relatively very few ions that receive nearly maximum or minimum change of orbit diameter respectively on their first transit can reach the detector if no phase-defining slit is employed. Thus these ions, which account for the rather broad skirts of the peaks previously mentioned, can be prevented from reaching the detector and the skirts may be eliminated by use of a wide phase-defining slit. However, this slit cannot prevent a relatively small current of ions from reaching the detector of any frequency in a broad range centered at $f=nf_0$ (i.e. half way between successive sharp peaks centered at $f=(n+\frac{1}{2})f_0$. The width of this range is the same fraction of the distance between successive sharp peaks that the total range of phases of ions on their first transit which pass the phase-defining slit is of $2\pi$ radians.

It is convenient to describe the second basic feature of the device of the present invention as the observation of "odd" peaks, for which $f=(n+\frac{1}{2})f_0$, rather than "even" peaks, for which $f=nf_0$ as in the prior device. Each odd peak may be thought of as a coalescence of two "satellite" peaks (one for each of the two wide phase ranges per cycle passed by the phase-defining slit) which were eliminated as undesirable in the prior device. They become superimposed as the net change of diameter, which must be finite in the absence of an auxiliary means of slit displacement, is made zero. The presence in the new device of an even peak midway between each pair of odd ones, causes negligible interference wth either mass or intensity measurements on odd peaks, even if one underlies an odd peak for a different type of ion. This is because the even peaks, though very much broader, are correspondingly very much less intense and very nearly flat-topped. In a typical practical embodiment of the new device described below, the even peaks are of the order of 100 times as broad and 0.01 times as high as the odd ones. It is therefore possible with the novel device to have ions execute a minimum of two complete revolutions rather than three as in the prior one without experiencing difficulties with satellite peaks.

The first basic feature of the novel device, auxiliary means of orbit displacement, makes materially higher the limits to which resolution and precision of mass measurement may be raised by narrowing slits than with the prior device largely because it permits use of considerably smaller amplitudes of diameter modulation. These limits are set by broadening and shifting of peaks by secondary effects of the small but finite modulator fields from the widths and positions they would have if each velocity modulation were strictly the same simple harmonic function of phase and if the circulation time of all ions were determined solely by the action of the magnetic field. These secondary effects comprise: (1) anharmonicity of the velocity modulations; (2) dependence of the change of velocity by a modulator on an ions' incoming velocity and hence of the second velocity modulation on the first; (3) change of the circulation time by the modulator fields from that in a magnetic field alone; and (4) lateral deflections and displacements of the orbits of ions that traverse the modulator slits off center caused by non-uniformity of the modulator fields. Because of this non-uniformity, all these effects as well as the amplitude of first order (harmonic) velocity modulation vary with the radial distance from the center of each modulator as well as the angle at which ions pass its central plane. Hence, all tend to broaden peaks and to shift their centers of gravity from the exact frequencies $nf_0$ or $(n+\frac{1}{2})f_0$ by amounts which obviously increase with the amplitude of velocity modulation.

The first basic feature of the novel device also permits use of materially lower R.F. voltage, and power at much higher frequencies and orders for a given ion energy than were possible with the prior device. The higher frequencies and orders result from the use of an appreciably smaller spacing between modulator plates and the fact that, for optimum efficiency of velocity modulation, ions should traverse each modulator in about one R.F. cycle (while they take one cyclotron cycle for a complete revolution). The ratio of modulator slit spacing to width should be minimum for maximum order and hence resolution, but not less than about two to avoid excessive non-uniformity of modulator fields in either device. If, as is reasonable, the width and spacing of the modulator slits are decreased along with the width of the entrance and exit slits from those used in the prior device about in proportion with the amplitude of diameter modulation, the ratio of peak width to the separation of successive order is about the same so that the order and hence the resolution are proportionately greater.

Finally, while use of smaller amplitudes of diameter modulation than in the actual device described in my above-cited paper is possible with such a prior device employing a smaller spacing between the entrance and phase-defining slits, use of auxiliary means of orbit displacement is *required* to provide simultaneously that ions receive *no* net change of diameter. Thus the first feature is required in order that the advantages of observing odd peaks, i.e., of the second feature, may be realized, since otherwise these peaks are doubled.

Aside from allowing achievement of substantially higher intensity for given resolution or vice versa, the advantages of the second basic feature of the novel device include freedom from the necessity in the prior device of adjusting the ratio of the change in diameter on the first turn to that on the second, as by moving the entrance, exit or phase-defining slit, so as to avoid splitting of peaks in two. As demonstrated in my paper cited above, this adjustment must be made in order that the two groups of ions per cycle passed by the narrow phase-defining slit may both pass the exit slit at the same frequency, $f=nf_0$. It can be shown that the center of gravity of the two peaks is displaced from this value by an amount which increases with their splitting. Furthermore, it can be shown that the precision of the adjustment for zero splitting is inadequate to insure that this displacement of the center of gravity does not cause a serious error in mass measurements involving peaks of different orders. Thus, the second feature as well as the first, which minimizes such errors due to anharmonicity, etc. and allows use of much higher orders, permits precision measurements of the ratios of masses differing considerably from unity by the technique of overlapping orders. Both features thereby vastly improve the versatility of the novel device for making precision mass measurements as compared to the prior one with which precision measurements are only possible on peaks of the same order and hence, as with conventional devices, on very close masses. The second feature helps further to reduce "overlap" errors due to differential displacement of two peaks having different orders as well as peak broadening, both of which stem from secondary effects of the modulator fields. Like the first order velocity change, these tend to cancel when the phases at which ions traverse the two modulators differ by 180° rather than adding as when ions make three (or more) transits at the same phase in the prior device. Moreover, the variation of the frequency at which ions reach the detector with the distance from the center of each modulator that they pass its central plane, is materially less than when successive transits are made out of phase than when they are made in phase.

When analyzing a sample with the novel device, one sweeps either the radio frequency or the magnetic field over a pre-selected range so that the beam current output at the ion detector beyond the exit slit will have peaks at frequencies (or fields) corresponding to respective ion masses in the sample. Alternatively, a constant field and frequency may be used, and the phase of the R.F. applied to the second modulator relative to that of the R.F. applied to the first may be swept through an appropriate range.

As a sub-combination for the novel invention, the ion beam circulates in an evacuated chamber which could have, for example, the shape of either a doughnut or a pill box. The poles of a magnet are then placed on opposite sides of the chamber in the usual manner. I have found it highly desirable to place the ion source and the ion detector outside this magnetic field. Removing these elements from the magnet gap makes them much more accessible and allows use of higher accelerating voltages and better means of collimating the ion beam in the source as well as use of an electron multiplier rather than a simple collecting plate as a detector. It thus permits achieving both higher intensity and a better signal-to-noise ratio. In addition, by allowing use of a smaller gap length, it permits use of fewer ampere turns and less power for achieving a given flux density and facilitates achieving a homogeneous field.

Ions of desired mass-to-charge ratio are conducted from the external source and focused onto the entrance slit so as to pass through it in the proper (azimuthal) direction by a suitable electrostatic deflector. Similarly, those passing the exit slit are conducted to the external detector by another such deflector. The simplest deflector is the Wien filter with plane parallel electrodes between which the electric force on each desired ion very nearly cancels the transverse magnetic force so that the orbit of each ion in the filter is nearly rectilinear. Use of straight filters requires, however, that the beam enter and leave the magnetic field far from radially so that ions off the median plane experience, as they cross the fringing field, forces in the direction of the main field that cause considerable over-focusing of the beam in this direction. To avoid this difficulty, it is preferable to employ curved deflectors of radius somewhat greater than the difference between the radius of each pole and that of the circular orbits of ions after they pass the entrance slit and thus to provide that they both enter and leave the field in radial directions. Further advantages of curved over straight deflectors are that the overall path length of the ion beam is somewhat shorter and that the dispersion at the entrance slit of ions having different velocities is less when curved deflectors are utilized. This dispersion adds to that caused by the action of the magnetic field on the beam as it reaches the first modulator slit. It may be cancelled by conducting the beam from the source to the curved deflector in front of the entrance slit through an external curved one having the proper opposite curvature so that double focusing (for various angles and velocities) may be achieved at this entrance slit. Alternatively, such double focusing may be achieved at the first modulator slit.

Use of an external source with electrostatic deflectors to conduct the beam therefrom and to focus it on the entrance slit has the further advantage of providing some preselection of the range of masses that can pass this slit and enter the analyzing region and thus of materially reducing the number of undesired ions that can strike the walls of the chamber and possibly cause undesirable local electric fields in this region.

As an integral part of the present invention, in order that the modulator be not required to change the orbit diameter of accepted ions so that they miss the entrance slit, I utilize any desired type of orbit-displacing means. By way of example, the orbit-displacing means could comprise the aiming of the ion beam at some small angle with respect to the plane of the magnet poles which would cause the mean orbit of the ions to be a helix of pitch just sufficient to make them miss the entrance slit and adjacent electrostatic deflector.

As an alternative and novel orbit-displacing means, I have found that I can set up a local disturbance in the magnetic field as, for example, by placing shims of magnetic material in contact with the magnet poles at 270° from the entrance slit. This novel local disturbance will cause a shift in the center of the orbit of the ions each time they pass it. Clearly, whether the displacement of the orbit is parallel or perpendicular to the magnetic field, the entrance slit, the phase-defining slit, and the detector slit will be appropriately placed so that the beam of desired ions must necessarily pass each.

Another type of orbit-displacing means could be a uniform electric field transverse to the magnetic field over the entire analyzing region. Here again, the center of the orbit of the ions is displaced laterally. However, in this case, the displacement is continuous at a uniform rate rather than stepwise.

The use of an electric field as an auxiliary orbit-displacing means is to be distinguished from prior uses of electric fields that produced orbit displacement in mass spectrometers. In the present device, the displacement is necessary solely to cause the beam to miss the ion source and/or the entrance slit, and takes no part in the selection of ions. This is to be contrasted to the type of device shown, for example, in the article by Bleakney and Hipple in Physical Review, vol. 53, page 521 (1938). In this device an electrostatic field is used in combination with a perpendicular magnetic field to achieve displacement together with perfect spatial focusing, but this electric field plays an important role in the mass measurement, and is not used solely in order to cause the beam to miss the ion source or entrance slit as in the present device.

Accordingly, a primary object of this invention is to provide a novel mass spectrometer having substantially improved resolution and intensity characteristics.

An important object of this invention is to cause ions of given mass-to-charge ratio to pass a first modulator means over a range of phases of the modulation frequency and to cause each to pass a second modulator means at a phase displaced by very nearly 180° from its initial phase.

Another object of this invention is first to change the velocities of ions of given mass-to-charge ratio and then to change the velocities of said ions by equal and opposite amounts in order to distinguish them from other ions of a different mass-to-charge ratio.

A further object of this invention is to provide a novel mass spectrometer wherein modulator means are used to which radio frequency voltages are applied whose frequency is some odd half-integral number times the cyclotron frequency of the ions to be selected.

Another object of this invention is to provide a novel mass spectrometer which uses modulator means for changing the diameter of the orbit of an ion beam in a magnetic field, and is provided with a relatively wide phase-defining slit or none at all.

A further object of this invention is to provide a mass spectrometer which utilizes a phase-defining slit having a width of the order of 10 to 100 times or more that of the entrance slit or the exit slit.

Yet a further object of this invention is to provide a novel radio frequency mass spectrometer wherein orbital displacement of the ion beam is achieved by some auxiliary means other than the modulator means.

A further object of this invention is to provide a novel orbit-displacing means for the ion beam of a radio frequency mass spectrometer which is comprised of an inhomogeneous magnetic field such as could be produced by shims of magnetic material fastened to the pole faces of the magnet.

A further object of this invention is to provide a novel radio frequency mass spectrometer wherein the ion source is connected to an evacuated orbital path and the selected ions of the ion beam are taken into and out of the evacuated orbital path by electrostatic deflectors.

Another object of this invention is to provide a radio frequency mass spectrometer wherein curved electrostatic deflectors are used for introducing an ion beam into a magnetic field and extracting it therefrom, in which deflectors the electrostatic field is perpendicular to the main magnetic field.

These and other objects of this invention will become more apparent from the following description when taken in conjunction with the accompanying drawings, in which:

FIGURE 1A schematically illustrates the operation of the mass synchrometer described in applicant's article mentioned above in the Review of Scientific Instruments and illustrates a portion of the ion beam after it is emitted from the ion source.

FIGURE 1B shows the ion beam of FIGURE 1A after it first passes through the modulator.

FIGURE 2A is a plot of the change in orbit diameter of the ion beam of FIGURES 1A and 1B as a function of the phase of the R.F. voltage when an ion passes the central plate of the modulator. It illustrates the changes in diameter experienced by the ions labeled in FIGURES 1A and 1B on their first, second and third orbital rotations when the frequency is an integral multiple of the cyclotron frequency of the ions.

FIGURE 2B is similar to FIGURE 2A, but illustrates the case where the frequency of R.F. voltage applied to the modulator is such that the ions of the ion beam of FIGURES 1A and 1B generate "satellites" which are symmetrically disposed about the main peaks.

FIGURE 3 shows the beam current intensity of the prior device as a function of the radio frequency for two orders.

FIGURE 4 is a top plan view of one embodiment of the device of the present invention.

FIGURE 4A is a side view of the plate which contains the entrance slit, phase-defining slit and exit slit in the device of the present invention shown in FIGURE 4.

FIGURE 5 is a side view of the novel structure of FIGURE 4.

FIGURE 6A schematically illustrates the operation of the structure of FIGURES 4 and 5 when a plurality of preselected ions are initially emitted from the entrance slit.

FIGURE 6B illustrates the operation of the system of FIGURE 6A after the ions of FIGURE 6B make their first pass through the modulator.

FIGURE 6C illustrates the ions of FIGURES 6A and 6B when the frequency of the R.F. voltage on the modulator is some integral number times the cyclotron frequency of the selected ions.

FIGURE 6D shows the ions of FIGURES 6A and 6B for the case where the radio frequency is some odd half integral number times the cyclotron frequency of the ions selected, and specifically illustrates how a large portion of each train of ions of selected mass pass through the detector slit in accordance with the invention.

FIGURE 7A illustrates the displacement of the beam orbit as a function of phase of R.F. modulator voltage and specifically illustrates for the case of FIGURES 6A, 6B and 6C how the beam is modulated when the radio frequency is equal to an integral number times the cyclotron frequency of the ions of the beam.

FIGURE 7B illustrates the change in diameter caused by the modulator as a function of phase and illustrates the manner in which a substantial portion of the ions of the beam of FIGURES 6A, 6B and 6D are passed through the phase-defining slit and then the exit slit when the radio frequency is equal to some odd half integral number times the cyclotron frequency of the ions in the beam.

FIGURE 8A illustrates the ion beam current for a given mass as a function of modulator frequency which is received by the detector of FIGURES 4 and 5, and specifically illustrates the improved current intensity achieved in the present invention.

FIGURE 8B shows the even and odd peaks of ion current produced in the present device for one mass along with the current peaks of ions of a different mass in the sample.

FIGURE 9 is a top view of a second embodiment of the present invention wherein orbital displacement is caused by a magnetic shim.

FIGURE 9A illustrates a plate containing the entrance slit, the phase-defining slit, a second intermediate slit and the exit slit for the embodiment of FIGURE 9.

FIGURE 10 is a side view of FIGURE 9.

In describing the present invention, it is important first to understand the operation of the previously known mass synchrometer of the type shown in my previously noted publication. Details of operation of this device, and a mathematical analysis thereof are given in that paper. The present description is a qualitative one, and is used for purposes of comparison to the novel structure.

The operation of the prior device known as the "mass synchrometer" is shown by FIGURES 1A, 1B, 2A, 2B and 3. The complete device is contained in an appropriate evacuated chamber shaped like a pill-box which includes an ion source 10 of any appropriate structure that can receive a sample and generate therefrom a nearly monoenergetic ion beam. The source 10 is positioned adjacent to a plate 11 which contains slits 12, 13, 14 and 15. These slits are relatively small in width. In a specific illustrative application they were 0.030, 0.020, 0.190 and 0.060 inch wide respectively and from ½ to ¾ of an inch long. They were spaced from one another by approximately ⅔ of an inch. The diameter of the outer orbit was approximately 11 inches, while the inner orbit was slightly less than 9 inches.

A uniform magnetic field illustrated by the conventional circled dot 16 causes the ion beam passing through entrance slit 12 to travel on a circle in the usual manner, the beam being focused on a modulator 17. The modulator 17 is formed of three spaced plates 18, 19 and 20 containing slits 21, 22 and 23 in registry with one another. Slits 21, 22 and 23 in one version of the illustrative structure are 0.030 inch wide and spaced 0.090 inch apart. An R.F. source 24 of some appropriate type is connected from plate 19 to grounded plates 18 and 20. An ion beam detector 25 of any appropriate type such as a simple collecting plate in a shielding box is placed behind exit slit 15 in plate 11.

In operation, an adjustable accelerating voltage is applied to the ion source 10 to propel a beam of ions through entrance slit 12. This monoenergetic beam of ions is caused to move in a circular path by the magnetic field 16 in the usual manner, the diameter of the orbit of any ion being dependent upon the mass of the ion. Thus, a mass spectrum is formed on the bottom of plate 20 with ions of any desired mass being focused on and made to pass through slits 23, 22 and 21 by proper adjustment of the accelerating voltage.

If no R.F. voltage is applied to plate 19, the ions passed by slits 23, 22 and 21 can all strike a plate (not shown) placed behind ion source 10 and thus be detected. Under these conditions, the device operates as a simple 180° mass spectrometer with relatively low resolution.

When R.F. voltage is applied to plate 19, the velocity of ions that pass through the modulator is modulated; i.e., it becomes an approximately harmonic function of the phase of the R.F. when an ion passes plate 19. Thus, the diameter of an ion's subsequent circular orbit is also a nearly harmonic function of this phase, those ions which pass plate 19 when the R.F. voltage is maximum (positive or negative), receiving no change in orbit diameter and these which pass when the R.F. voltage is zero (and reversing) receiving the greatest change in orbit diameter.

To describe the operation of the device of FIGURES 1A and 1B, I have selected six particles in the beam in FIGURE 1A and will follow operation of the system on these particles. Particle $M(1)$ is an ion of a first mass. Particle $M(2)$ is an ion of a second mass. Four particles of a third mass identified as $M(3)1$, $M(3)2$, $M(3)3$ and $M(3)4$ are also shown. It is assumed that ions $M(3)$ having the third mass are those to be detected so that their initial orbital diameters are such that they will pass through the centers of slits 21, 22 and 23. Particle $M(1)$ has a smaller mass than that of the ions $M(3)$ so that the diameter of its orbit is smaller. Consequently, it strikes plate 20 internally of slit 23. Particle $M(2)$ is heavier than the particles $M(3)$ so that the diameter of its orbit, as shown in dotted lines, is larger than the orbit of particles $M(3)$. Thus, it strikes plate 20 outside of slit 23. In addition to the particles shown, there may also be ions of mass very close to that of ions $M(3)$ so that they too may, on the first turn, pass through slits 21, 22 and 23. These particles are not shown.

In FIGURE 2A, I have shown the orbital displacement of ions $M(3)$ as anharmonic function of the phase of the (sinusoidal) voltage on plate 19 when they pass this plate. I have assumed in FIGURE 2A that particle $M(3)1$ passes modulator plate 19 at phase $\phi_1$ so that it receives a change in diameter $\Delta D_1$. Particle $M(3)2$ passes plate 19 at phase $\phi_2$, and receives the largest inward deflection $\Delta D_2$. Particle $M(3)3$ passes plate 19 at phase $\phi_3$ and receives deflection $\Delta D_3$ exactly equal to deflection $\Delta D_1$ of particle $M(3)1$. Finally, particle $M(3)4$ passes plate 19 at phase $\phi_4$ and receives a positive change of orbit diameter $\Delta D_4$.

The deflection $\Delta D_1$ of ions $M(3)1$ and $M(3)3$ is just equal to the spacing of slit 13 from slit 12 so that they pass through phase-defining slit 13. Particles $M(3)2$ and $M(3)4$, however, receive an incorrect change in diameter ($\Delta D_2$ and $\Delta D_4$ respectively) so that they impinge on plate 11 on either side of slit 13. Note that $\Delta D_2$ must be less than twice $\Delta D_1$ so that no particles which pass modulator 17 will be able to enter slits 14 or 15 directly after but one turn.

If slits 13 and 14 are spaced by the same distance as slits 12 and 13, and if the two groups of ions passed by slit 13 are also to be passed by slit 14, the modulator 17 must decrease the orbit diameter of both groups the second time by the same amount $\Delta D_1$. If this is to be accomplished, it is necessary that the frequency of the R.F. source 24 be very nearly equal to some integral number times the cyclotron frequency of ions $M(3)$ In such a case, as shown in FIGURE 2A, some large integral number ($n$) of cycles of the R.F. source will elapse while ions $M(3)$ and $M(3)3$ are in orbit and they will return to the modulator 17 at exactly the proper phases ($\phi_1+n\pi$ and $\phi_3+n\pi$) so as again to have their diameter decreased by the appropriate amount $\Delta D_1$ and hence so that they will pass through slit 14. Note that the phase at which an ion of mass slightly different from that of ions $M(3)$ passes slit 22 the second time will differ from that required to make it pass through slit 14 by an amount equal to $2\pi$ times the fractional difference between its cyclotron frequency (or mass) and that of ions $M(3)$ multiplied by the large integer $n$. Therefore, the ion will pass slit 22 the second time, for example, at phase $\phi_5$ of FIGURE 2A in the second group of cycles shown so that its diameter will be increased by some amount $D_5$ and it, like ion $M(3)4$, will strike plate 11 (or the back of the source) at some point outside slit 12. Because of this, an exceedingly high resolution, as compared to the resolution of prior mass spectrometers having comparable slit widths was achieved in the prior art device.

As indicated above, it is possible to detect the ion beam emerging from slit 14 with relatively high resolution. For even higher resolution, however, and in order to eliminate "satellites," ions are caused to execute a third orbit and are detected after passing through exit slit 15.

The satellites are caused by conditions illustrated in FIGURE 2B. In general, during the frequency sweep, the frequency of the R.F. source is some integral number $n$ plus or minus a small additional fraction times the cyclotron frequency $f_0$ ions $M(3)$. When the radio frequency is such that this additional fraction has the proper value $\delta_0$, ion $M(3)1$, which passes modulator 17 at phase $\phi_1$ in its first orbit, passes the modulator at phase $(\phi_3+2n\pi)$ the second time as shown in FIGURE 2B. Since, for this phase as well as for phase $(\phi_1+2n\pi)$, ion $M(3)1$ receives a reduction in its orbit diameter of amount $\Delta D_1$, it moves first from slit 12 to slit 13 and then from slit 13 to slit 14. Thus, for the frequency $(n+\delta_0)f_0$, there is some ion current through slit 14.

In the same manner, for the frequency $(n-\delta_0)f_0$, ion $M(3)3$ passes modulator 17 in the first orbit at phase $\phi_3$ and in its second orbit phase $(\phi_1+2n\pi)$, as shown in FIGURE 2B. Thus, for this frequency, there is also an ion current through slit 14.

The resultant plot of ion current detected after two turns at a detector behind slit 14 as a function of the frequency of the R.F. source 24 is shown in FIGURE 3 for two orders. This shows the main current peak 26 which occurs at a frequency that is some integral number $n_1$ times the cyclotron frequency of ions $M(3)$. Symmetrically disposed about peak 26 are satellite peaks 27 and 28, each half as large as peak 26, whose central frequencies are $(n_1-\delta_0)f_0$ and $(n_1+\delta_0)f_0$. A main peak and two satellites occur for each integer $n$. A second set of such peaks for the value $n=n_1+1$ is shown at the right of FIGURE 3.

From an accurate measurement of the frequency for the center of the main peak 26 and a knowledge (readily obtainable) of the value of $n$, an accurate value of the ratio of mass-to-charge of ions $M(3)$ could be obtained if the absolute value of the magnetic field were accurately known. Because the relative difference between the central frequencies of two types of ions, which is accurately equal to the relative difference in their masses, may be made with much greater accuracy and does not require precise knowledge of the value of the magnetic field, such measurements are of much greater practical value and are the type of mass measurements performed almost exclusively. Similarly, the absolute intensity of a single central peak is of far less importance than the ratios of intensities of two or more central peaks for different types of ions in a sample. Thus, virtually all measurements are made with two or more different types of ions formed from the sample or samples introduced into the ion source. Peak 29 of FIGURE 3 represents the central peak for a second type of ion which might, for example, be one of known mass in terms of which the mass of ions $M(3)$ could be determined from the relative mass difference.

It is thus clear that all practical measurements are considerably facilitated if the satellites are eliminated and each type of ion produces only one rather than three peaks per order. An explanation of how this is accomplished by making accepted ions execute three rather than two turns is indicated at the right of FIGURE 2B. Thus, when the frequency is $n_1(f_0+\delta_0)$, ion $M(3)1$ which passes slit 22 the first time at phase $\phi_1$ and the second time at phase $(\phi_3+2n\pi)$, passes it the third time at a later phase $[2\phi_3-\phi_1+4n\pi]$ so that it does not get the proper further deceleration to pass slit 15. Similarly, when the frequency is $n_1(f_0-\delta_0)$, ion $M(3)3$ which passes slit 22 the first time at phase $\phi_3$ and the second time at phase $(\phi_1+2n\pi)$ passes it the third time at an earlier phase $[2\phi_1-\phi_3+4n\pi]$ and so also canot pass through slit 15 and be detected. On the other hand, when the frequency is $n_1 f_0$, every ion returns to the modulator at the same phase each time it passes it, regardless of how many turns it makes. Thus, after three turns, only the central peak 26 is observed for each type of ion in each order.

A top plan view of one embodiment of the present invention is shown in FIGURE 4 wherein an evacuated doughnut-shaped container 30 is placed between magnet poles 31 and 32, as shown in FIGURE 5, which generate a uniform, constant magnetic field, as schematically illustrated by the conventional dot-in-a-circle 32' in FIGURE 4.

To maintain an appropriate vacuum in container 30, I have provided a typical vacuum pump 33 of any standard construction connected thereto. A source of ions 34 which is positioned outside the gap between magnet poles 31 and 32 injects ions into container 30 through an electrostatic deflector or filter 35. More specifically, a beam of ions, generated in source 34, is accelerated to the desired energy and then conducted to entrance slit 39 by filter 35, which consists of electrostatic plates appropriately formed and supplied with the proper voltage to guide the ion beam into the magnetic field and to focus ions of a restricted range of mass about the desired mass normally on entrance slit 39. Similarly, the highly resolved ion beam is conducted from exit slit 41 to detector 36 outside the magnet gap by the electrostatic filter 37. Alternative to the straight filters 35 and 36, curved filters 35a and 37a, shown in dotted lines, are preferred for the reasons given above. To offset the effect of energy dispersion in filter 35a, another (35b) should be placed between it and the source 34a having opposite curvature, as shown. A similar external filter 37b to conduct ions across the fringing field to detector 36a, though shown curved, may be of the simpler linear variety since the emergent beam is highly monoenergetic.

By way of example, the air gap may be 15 inches in diameter and 2 inches in height, the minor diameter of the doughnut 30 being slightly less than 2 inches. The magnet is constructed in any usual manner, and will provide, for example, a field strength of 10,000 gauss.

Within the doughnut 30 there is provided a plate 38 best shown in FIGURE 4A, which contains three slits; entrance slit 39, phase-defining slit 40, and exit slit 41. These are placed one above another as shown so that, the ion beam, as illustrated in dotted lines in FIGURE 5, after emerging from entrance slit 39, must spiral downward to pass through phase-defining slit 40 (at least once, and more than once, if desired, and if slot 40 is high enough) and thereafter must spiral once further downward to emerge through slit 41. Spiralling may be accomplished by directing the beam slightly downward from the source. This spiralling is used solely to cause the beam to miss slits 39 and 40 after it travels 360° from each, and plays no part whatsoever in the mass measurement.

The modulator 43, also contained within doughnut 30, as shown in FIGURES 4 and 5, is comprised of plates 44, 45 and a central plate 46 which have slits therein in registry of which slit 47 in plate 46 is shown in FIGURE 5. An R.F. source 48 is connected from central plate 46 to outer plates 44 and 45. It will be noted from FIGURE 5 that the slits in modulator plates 44, 45 and 46 are elongated sufficiently to allow the beam to pass on two separated turns of its spiral orbit.

The manner in which the novel device of FIGURES 4 and 5 operates is to be described with reference to FIGURES 6A through 6D, 7A, 7B, 8A and 8B. Referring first to FIGURES 6A through 6D, I have schematically illustrated the operation of the structure of FIGURES 4 and 5 in the same manner as it was illustrated for the prior type device of FIGURES 1A and 1B. Thus, I schematically show the ion source 34 in FIGURE 6A as being immediately adjacent to entrance slit 39 of plate 38. With the accelerating voltage and deflector voltages adjusted for detection of ions $M(3)$, ion $M(1)$ with smaller mass and ion $M(2)$ with larger mass will travel in orbits of smaller and larger diameter respectively and will impinge on either side of the slit in plate 44, while ions $M(3)1$ through $M(3)5$, (all of the same mass) will be focused by the magnetic field 32 on the slits in plates 44, 45 and 46. Thus, all ions M(3) are shown as travelling in the same orbit. While I have shown them as being distributed over a substantial portion of a half turn, they, in fact, occupy a distance less than half the thickness of the modulator, for all arrive at slit 47 during a portion of one half cycle of the radio frequency.

If no R.F. voltage is applied to the modulator, ions M(3) follow the single spiral orbit through slits 40 and 41 so that a steady current thereof reaches the single detector used and the new device, like the prior one, functions as a simple 180° mass spectrometer providing low resolution. However, when R.F. voltage is applied to modulator 43, ions M(3)1 through M(3)5 which pass slit 47 respectively at phases $\phi_1$, through $\phi_5$, receive different changes in orbital diameter ($\Delta D$) as shown in FIGURE 7A so that their subsequent orbits are dispersed as shown in FIGURE 6B. It is assumed that their times of arrival at slit 47 and the R.F. voltage are such that $\Delta D$ for ion M(3)1 and that for ion M(3)5 are respectively plus and minus half the width ($w_1$) of phase-defining slit 40. Thus, as shown in FIGURE 6B, ion M(3)1 just clears the right-hand edge of slit 40, and iron M(3)5 just clears the left-hand edge of slit 40, while ions M(3)2 through M(3)4, which receive intermediate changes in diameter, pass through slit 40 nearer its center. It is obvious that ions which pass slit 47 of modulator 43 at phases earlier than $\phi_1$ or later than $\phi_5$ by no more than $(\pi - 2\phi_1)$ will impinge upon plate 38, and will not clear slit 40. Ions M(3)1 through M(3)5 which do pass through slit 40 will, of course, all be focused again on the modulator slits, by the action of the magnetic fields as FIGURE 6B shows.

FIGURE 6C illustrates what then happens to these ions if the frequency of the R.F. voltage applied to the modulator is some integral number $n$ times their cyclotron frequency $f_0$ so that each passes slit 47 the second time at the same phase $\phi_1 + 2n\pi$ through $\phi_5 + 2n\pi$ as it did the first time. As shown in FIGURE 7A, each then receives the same change in diameter as it had previously. Hence, as FIGURE 6C shows, on arriving one half turn later at exit slit 41, ions M(3)1 through M(3)5 are spread over a distance equal to twice the width of slit 40. Thus only ion M(3)3 of those shown, (together with others not shown which arrived at slit 47 the first time at a phase in a very small range about phase $\phi_3$ and which thus get practically no change of diameter on either passage through the modulator) can pass through exit slit 41 and reach the detector.

It should also be clear from FIGURE 7A that, at some frequency slightly higher than $nf_0$, ion M(3)2 will arrive at slit 47 the second time at the later phase $\phi_4 + 2n\pi$ so that its original increase in diameter will be cancelled and it will pass exit slit 41 and reach the detector. Similarly, at a still higher frequency ion M(3)1 will arrive at slit 47 the second time at phase $\phi_5 + 2n\pi$ and so receive a deceleration just sufficient to cancel its original acceleration and be able to arrive at the detector. Thus, for each frequency in a broad range centered about $nf_0$, a small current of only a very few of the ions M(3) that pass slit 47 the first time per R.F. cycle at phases between $\phi_1$, and $\phi_5$, will be detected. For all frequencies outside this range (except as noted below) the net change in diameter after two transits through the modulator cannot be zero for any of the ions M(3)1 through M(3)5 so that all of them strike plate 38 on either one side or the other of exit slit 41 and no current is detected. Therefore, as either the radio frequency or the magnetic field is swept over the appropriate range, a broad flat-topped peak for which the central frequency is $nf_0$ is observed for each integer $n$ (i.e. for each order). This is shown as peak 50 for order $n_2$ in FIGURE 8.

When the radio frequency is made equal to an odd half integral number times the cyclotron frequency of ions M(3)1 through M(3)5, the situation is as shown in FIGURES 6D and 7B. Referring first to FIGURE 7B, it will be seen that, at such a frequency, each ion M(3)1 through M(3)5 will receive, on its second passage through the modulator, a change in diameter, which is equal to its original change in diameter, but is opposite in direction. Thus, particle M(3)1, which first passed modulator slit 47 at phase $\phi_1$ to receive a positive change in diameter $w_1$ (where $w_1$ is the width of phase-defining slit 40), will, at phase $[\phi_1 + (2n+1)\pi]$, receive an equal but opposite diameter change $-w_1$. Similarly, particle M(3)5 which originally received a change $-w_{1/2}$ in diameter will, on its second pass through modulator 43 at phase $[\phi_5 + (2n+1)\pi]$ receive a change in diameter $+w_{1/2}$. In like manner, each of the intermediate particles M(3)2 through M(3)4 will receive a second change of diameter equal in magnitude but opposite in sign to its first change of diameter. FIGURE 6D shows the orbits of ions M(3)1 through M(3)5 after they emerge from phase-defining slit 40 for this case where the frequency is $(n \pm \frac{1}{2})f_0$. It shows that after passing 43, they all proceed in orbits of the original diameter and thus all pass through exit slit 41 to the detector.

It should also be clear from FIGURE 7B that, if the radio frequency is slightly higher than $(n+\frac{1}{2})f_0$, ion M(3)1, which passes slit 47 the first time at phase $\phi_1$, will pass it the second time at a phase slightly later than $[\phi_1 + (2n+1)\pi]$ and will therefore receive a decrease in orbit diameter less than the increase it received initially. Thus, it will strike plate 38 outside slit 41. For such a frequency, ion M(3)5 will receive an increase in orbit diameter on its second passage through the modulator greater than the decrease it initially received and so it will also strike plate 38 outside slit 41. Similarly, we see that the net change in diameter after two transits through the modulator will be positive for all ions M(3), so that all will strike plate 38 outside slit 41 and none will reach the detector. From similar reasoning it is clear that, for a radio frequency slightly less than $(n+\frac{1}{2})f_0$, all ions M(3) will receive a net decrease in orbit diameter as a result of passing the modulator twice and will strike plate 38 inside slit 41 so that none will reach the detector. Thus, we see that the odd current peak centered at the frequency $(n+\frac{1}{2})f_0$ is very much sharper than the even one centered at frequency $nf_0$. Also, because at frequency $(n+\frac{1}{2})f_0$ all ions M(3)1 through M(3)5 reach the detector while at frequency $nf_0$ only very few of them do, it is evident that the odd peak will be very much higher than the even one.

The intense sharp odd peaks for two consecutive orders centered at frequencies $(n_1-\frac{1}{2})f_0$ and $(n_1+\frac{1}{2})f_0$ are shown as current peaks 51 in FIGURE 8A. It should be noted that, while increasing the width $w_1$ of the phase-defining slit 40 increases the width but not the height of broad even peaks such as 50 of FIGURE 8A, it increases the height but not the width of the odd peaks such as 51. Thus, as will be shown more fully hereinafter, $w_1$ can be made large enough in the new device so as to provide up to 100 times the current intensity for the same resolution of the prior device when measurements are made on the odd rather than the even peaks.

The entire foregoing description of the invention, of course, applies only to the train of ions passing the center of the modulator during part of the half-cycle of radio frequency between phases $\phi_1$ and $\phi_5$. Clearly, a second train of ions which passes slit 47 during an equal range of phases centered about phase $\phi_3 + \pi$ (i.e. one half cycle later) will be treated in the same manner as above. Each of these two trains per cycle contributes one-half of the total detected ion current.

As in the prior device, peaks may be observed by plotting detector current, for example on an oscilloscope screen, as either the radio frequency or the magnetic field is swept over the appropriate range. Alternatively, if the central plate 46 of the modulator is divided into an upper and a lower half and R.F. voltages are fed separately thereto of the same, constant frequency, the phase difference between these two voltages, may be swept over the appropriate range to display peaks.

A measurement of the frequency at which an odd peak 51 occurs could yield a value of the mass of the ions causing this peak current if the magnetic field strength were accurately known. In making an actual mass measurement, the electronic techniques set forth in my above noted paper entitled "Mass Synchrometer" can be utilized whereby a sample yielding ions of known mass as well as ions of unknown mass is injected into the ion source. The frequency of R.F. source 48 or the magnetic field is then swept to display an odd peak of the known mass and one of the unknown mass which are spaced from one another as, for example, are peaks $(n_1 - \frac{1}{2})$ and $(n_2 - \frac{1}{2})$ of FIGURE 8B. The relative difference between the two frequencies at which these peaks occur together with knowledge of their orders ($n_1$ and $n_2$) then gives an exceedingly accurate measurement of the unknown mass. Such measurements are best made with well known techniques of causing the patterns of the known mass and the unknown one to coincide on the same trace whereby the fractional shift of frequency necessary to accomplish this gives an accurate measure of the relative difference between the masses and hence of the unknown mass. Such techniques are specifically described beginning at page 645 of my above-noted article which I hereby incorporate as a part of the present specification.

As has been pointed out above, the auxiliary means for displacing the orbital path of the ions so that they will not strike the ion source or entrance slit could take many forms. In FIGURES 4 and 5, the ions source is arranged so that ions are injected into their orbit with a downward component of velocity and thus so that this mean orbit is helical.

An embodiment utilizing a different auxiliary means for displacing ion orbits is shown in FIGURES 9 and 10 wherein the magnetic field causing the orbital motion of the ion beam is controllably distorted. More specifically, in FIGURE 9, I have shown a top view of an evacuated doughnut-shaped container 100 into which the ion beam is injected. A magnetic field is applied, as schematically illustrated by circled dot 101, by magnetic poles 102 and 103, shown in FIGURE 10. The ions are introduced into can 100 through an electrostatic filter 104 (or, better, through curved filters 104a and 104b) connected to some ion source which is external to the magnet, as was the case for the device of FIGURES 4 and 5. In like manner, a second filter 105 (or, better, 105a and 105b) leads the detected beam from can 100 to some externally positioned detector means.

The magnetic poles 102 and 103, which are, of course, associated with an appropriate magnet winding (not shown), have magnetic shims 106 and 107 attached thereto. The shim dimensions for the case of a magnet having 15-inch diameter poles could be, for example, 1″ by ¼″ by 5″, although the specific dimensions for a specific structure should be determined experimentally. The effect of the magnetic shims 106 and 107 is to cause a local distortion of magnetic field 101, such that the center of the orbit of an ion will be displaced parallel to the plane of the orbit each time the ion passes the perturbed field region, as shown in FIGURE 9.

Since the beam is now being moved parallel to the plane of its orbit, a change is necessary in the arrangement of the modulator slits, the entrance slit, phase-defining slit and exit slits from that shown in FIGURES 4 and 5. More specificadlly, a plate 109 shown in FIGURE 9A will contain an entrance slit 110 positioned adjacent the output of the filter 104, a relatively wide phase-defining slit 111, an intermediate slit 112 and an exit slit 113 where 3½ orbital rotations of the beam are to be used between entrance and exit slits. The distance between centers of adjacent slits 110, 111, 112 and 113 is equal to the distance of orbital displacement per turn by the magnetic shims. Thus, after the first orbital rotation from slit 110, the beam will pass through slit 111, after the second through slit 112, and after the third through slit 113.

Two modulators 114 and 115, shown in FIGURE 9 are provided. The slits of modulator 114 are spaced from those of modulator 115 by the amount of orbital shift in two orbital rotations so that the velocity modulation occurs on the first and third orbital rotations of the beam only. On the second orbital rotation, the beam passes between the modulators and is not modulated. By providing the free orbital motion, one may increase still further the resolution of the device because the order is twice as great as when ions make only one revolution between modulator transits.

In the foregoing, the device has been described primarily as one for measuring ionic masses. However, it will be apparent that it may also be used for analysis or for quantitative separation of different isotopes in a given sample. Where, for example, it is desired to separate $U^{235}$ and $U^{238}$, the substantial resolution of the device can be decreased with a considerable increase in ion intensity. For such purposes, all slits would be opened quite wide. When using such wide modulator slits, it would be preferable to use electrostatic grids across the slits so that the modulating electric fields are maintained adequately uniform without the spacing of the plates having to be increased too much.

Although I have described preferred embodiments of my novel invention, many variations and modifications will now be obvious to those skilled in the art, and I prefer therefore to be limited not by the specific disclosure herein but only by the appended claims.

I claim:
1. A mass spectrometer including an ion source for generating an ion beam, a focusing means for causing the ions generated by said ion source to move in a predetermined path, a high frequency modulating means for altering the energy of the ions in said ion beam in accordance with the instantaneous phase of said modulating means when an ion passes through said modulating means, and a phase defining slit; said modulating means and said phase defining slit being positioned in the path of said ion beam; said phase defining slit being relatively wide, said focusing means including a uniform magnetic field substantially perpendicular to the plane of the orbit of said ion beam; and an auxiliary means for displacing the plane of the orbit of said ion beam so that the ions of said ion beam miss said ion source after 360° rotation; said auxiliary means including means for aiming the ions of said beam at an angle other than 90° with respect to said magnetic field.

2. A mass spectrometer including an ion source for generating a continuous ion beam, a focusing means for moving the ions of said beam in a helical path extending from said ion source, a high frequency modulating means extending across said helical path for altering the energy of the ions in said continous ion beam in accordance with the instantaneous phase of said modulating means when said ion passes through said modulating means, a source slit positioned in front of said ion beam, a phase defining slit and an exit slit; said phase defining slit being displaced from said entrance slit in a direction parallel to the axis of said helical ion path; said exit slit being displaced from said phase defining slit in a direction parallel to the axis of said helical ion path; and an ion detector located behind said exit slit; said phase defining slit being at least ten times wider than said entrance slit and said exit slits; said entrance slit, phase defining slit and exit slits having their centers on a common radius from the axis of said helical path.

3. The mass spectrometer substantially as set forth in claim 2 wherein said high frequency modulator has a frequency of some integral number times the cyclotron frequency of ions detected by said detector plus one-half.

4. A mass spectrometer for selecting ions of a predetermined mass from a beam of ions; said mass spectrometer including an ion source means, means for moving th ions of said ion source in a circular orbit, means for displacing the plane of the orbit of said ions to cause said ions to miss said ion source on their second orbital rotation, a high frequency modulating means positioned to receive the ions of said ion beam, and an ion detector; said high frequency modulating means modulating the velocity of each of said ions of said ion beam by an amount related to the phase of said high frequency modulating means at the instant said ions enter said modulating means; said high frequency modulating means having a frequency equal to some integral number times the cyclotron frequency of said ions to be selected plus one half whereby ions to be selected receive a velocity modulation on their second passage through said high frequency modulating means which is equal in magnitude but opposite in direction to their modulation on their first passage through said high frequency modulating means; said ion detector being positioned in the orbital path of said ion beam to receive ions of said ion beam after their second orbital passage through said high frequency modulating means.

5. The mass spectrometer substantially as set forth in claim 4 wherein said ion detector includes an exit slit positioned in front thereof; said exit slit being radially displaced from the center of said orbit of said ion beam by a distance equal to the radial displacement of said ion source means.

References Cited by the Examiner
UNITED STATES PATENTS

| | | | |
|---|---|---|---|
| 2,533,859 | 12/50 | Wideroe | 328—237 |
| 2,648,009 | 8/53 | Robinson. | |
| 2,719,924 | 10/55 | Oppenheimer et al. | |
| 2,768,302 | 10/56 | Bennett. | |
| 2,947,868 | 8/60 | Herzog. | |

OTHER REFERENCES

"Mass Synchrometer," by L. G. Smith et al. for the Review of Scientific Instruments, vol. 27, No. 8, August 1956, pp. 638 to 649.

RALPH G. NILSON, *Primary Examiner.*